(12) United States Patent
Lindner

(10) Patent No.: US 10,888,091 B2
(45) Date of Patent: Jan. 12, 2021

(54) ADJUVANCY COMBINATION

(71) Applicant: CRODA, INC., Edison, NJ (US)

(72) Inventor: Gregory James Lindner, Wilmington, DE (US)

(73) Assignee: Croda, Inc., Edison, NJ (US)

( * ) Notice: Subject to any disclaimer, the term of this patent is extended or adjusted under 35 U.S.C. 154(b) by 0 days.

(21) Appl. No.: 14/910,830

(22) PCT Filed: Jul. 30, 2014

(86) PCT No.: PCT/US2014/048813
§ 371 (c)(1),
(2) Date: Feb. 8, 2016

(87) PCT Pub. No.: WO2015/023434
PCT Pub. Date: Feb. 19, 2015

(65) Prior Publication Data
US 2016/0192649 A1 Jul. 7, 2016

Related U.S. Application Data

(60) Provisional application No. 61/865,757, filed on Aug. 14, 2013.

(51) Int. Cl.
| | | |
|---|---|---|
| *A01N 25/30* | (2006.01) | |
| *A01N 25/02* | (2006.01) | |
| *A01N 37/02* | (2006.01) | |
| *A01N 43/653* | (2006.01) | |
| *A01N 57/20* | (2006.01) | |
| *A01N 31/02* | (2006.01) | |
| *A01N 41/10* | (2006.01) | |
| *A01N 43/54* | (2006.01) | |
| *A01N 57/12* | (2006.01) | |

(52) U.S. Cl.
CPC ............ *A01N 37/02* (2013.01); *A01N 25/02* (2013.01); *A01N 25/30* (2013.01); *A01N 31/02* (2013.01); *A01N 41/10* (2013.01); *A01N 43/54* (2013.01); *A01N 43/653* (2013.01); *A01N 57/12* (2013.01); *A01N 57/20* (2013.01)

(58) Field of Classification Search
CPC combination set(s) only.
See application file for complete search history.

(56) References Cited

U.S. PATENT DOCUMENTS

| | | | |
|---|---|---|---|
| 4,681,617 A | 7/1987 | Ghyczy | |
| 5,631,205 A | 5/1997 | Killick | |
| 6,451,339 B2* | 9/2002 | Patel | A61K 9/4808 424/435 |
| 8,076,268 B2 | 12/2011 | Schnabel et al. | |
| 2002/0009437 A1* | 1/2002 | Hiromoto | A01N 25/04 424/94.6 |
| 2002/0161057 A1 | 10/2002 | Fefer | |
| 2007/0298970 A1 | 12/2007 | Mann | |
| 2009/0061028 A1* | 3/2009 | Arimoto | A01N 37/12 424/725 |
| 2009/0098274 A1* | 4/2009 | Kodama | A23J 3/08 426/657 |
| 2010/0113275 A1 | 5/2010 | Qin | |
| 2011/0111961 A1 | 5/2011 | Sun | |
| 2013/0053349 A1* | 2/2013 | Mainx | A01N 25/30 514/89 |
| 2013/0150241 A1 | 6/2013 | Elsik | |
| 2014/0031467 A1 | 1/2014 | Brown et al. | |

FOREIGN PATENT DOCUMENTS

| | | |
|---|---|---|
| EA | 015674 B1 | 10/2011 |
| EP | 539980 * | 5/1993 |
| EP | 862861 * | 9/1998 |
| EP | 1787514 | 5/2007 |
| EP | 2737799 A1 | 6/2014 |
| JP | 11-029413 * | 2/1999 |
| WO | 9400508 | 1/1994 |
| WO | 9616930 | 6/1996 |
| WO | 0174161 | 10/2001 |
| WO | 2005041661 | 5/2005 |

(Continued)

OTHER PUBLICATIONS

Tadros, Tharwat F., Emulsion Formation and Stability, Wiley-VCH Verlag GmbH & Co., Weinheim, Germany, Jan. 29, 2013, pp. 26-29.*
Martinez et al., "Synthesis of Biosurfactants: enzymatic esterification of diglycerol and oleic acid. 1. kinetic modeling," Industrial & Engineering Chemistry Research, vol. 50, pp. 6609-6614 (2011).*
JPO abstract, JP411029413A; abstracting JP 11-029413 (Feb. 2, 1999).*
Machine translation of JP 11-029413 (Feb. 2, 1999).*
Godoy. C.V., et al., "Diagrammatic scale for assessment of soybean rust severity," Oct. 10, 2005, pp. 63-68, vol. 31(1), Fitopatol. Bras. International Preliminary Report on Patentability and Written Opinion of the International Searching Authority for International Application No. PCT/US2014/048813 dated Feb. 16, 2016.

(Continued)

*Primary Examiner* — John Pak
(74) *Attorney, Agent, or Firm* — RatnerPrestia

(57) ABSTRACT

Adjuvants for agrochemical active formulation and methods of providing adjuvancy in agrochemical formulations are disclosed. An agrochemical formulation may comprise a first adjuvant comprising a fatty ester of a $C_3$ to $C_8$ polyol, or an oligomer thereof having from 2 to 5 repeat units, a co-adjuvant comprising an alkoxylated fatty alcohol having a $C_4$ to $C_{30}$ fatty chain and from 1 to 30 oxyalkylene groups, and at least one agrochemical active. Use of a combination of a first adjuvant comprising a fatty ester of a $C_3$ to $C_8$ polyol, or an oligomer thereof having from 2 to 5 repeat units, and a co-adjuvant comprising an alkoxylated fatty alcohol having a $C_4$ to $C_{30}$ fatty chain and from 1 to 30 oxyalkylene groups and a method for treating vegetation to control pests is also disclosed.

14 Claims, No Drawings

(56) References Cited

FOREIGN PATENT DOCUMENTS

| WO | 2006053048 | 5/2006 |
| WO | 2010003889 | 1/2010 |
| WO | 2010049070 | 5/2010 |
| WO | 2012145177 | 10/2012 |
| WO | 2013040006 | 3/2013 |
| WO | 2014025413 A1 | 2/2014 |

OTHER PUBLICATIONS

International Search Report for International Application No. PCT/US2014/048813 dated Oct. 2, 2014.
Russian Search Report for Russian Application No. 2016108712/13, dated Apr. 11, 2017, 3 pages.
Non Final Office Action for U.S. Appl. No. 14/910,846, dated Sep. 20, 2018, 25 pages.
Bogran, C. et al., "Using Oils as Pesticides," Texas A&M AgriLife Extension, published Nov. 2006, pp. 1-4.
Material Safety Data Sheet, "Spray Oil 10," Petro-Canada, Issued Jul. 25, 2011, pp. 1-6.
Final Office Action for U.S. Appl. No. 14/910,846, dated May 18, 2018, 24 pages.
European Communication for European Application No. 14 750 909.5, dated Jul. 11, 2018, 2 pages.
Final Office Action for U.S. Appl. No. 14/910,846, dated Apr. 17, 2019, 27 pages.

* cited by examiner

ADJUVANCY COMBINATION

CROSS REFERENCE TO RELATED APPLICATIONS

This application is the U.S. National Phase application of PCT International Application No. PCT/US2014/048813, filed Jul. 30, 2014, and claims priority of U.S. Provisional Patent Application No. 61/865,757, filed Aug. 14, 2013, the disclosures of which are incorporated herein by reference in their entireties for all purposes.

This application is related to, and claims the benefit of priority of, U.S. Provisional Application No. 61/865,757, entitled ADJUVANCY COMBINATION, filed on 14 Aug. 2013, the contents of which are incorporated herein by reference in their entirety for all purposes.

The present invention relates to adjuvants for agrochemical active formulation, and a method of providing adjuvancy in agrochemical formulations comprising said compounds with one or more agrochemical actives. The present invention also includes to treating crops with such formulations.

An adjuvant is generally defined as a chemical or a mixture of chemicals (commonly surfactants) capable of improving the biological activity or effectiveness of an agrochemical active. Adjuvants do not themselves control or kill pests. Instead, these additives modify some property (e.g. spreading, retention, penetration, droplet size etc.) of the agrochemical formulation which improves the ability of the active to penetrate, target, or protect the target organism. The typical types of compounds used as adjuvants may include surfactants, emulsifiers, oils, and salts. Adjuvants do not significantly inhibit translocation of the active in the treated plant. In addition, the adjuvant should not produce unwanted phytotoxic effects on the plant.

Once particular problem with formulations comprising more than one agrochemical active is that some combinations of actives do not work as well as expected when compared to the properties of the individual agrochemical actives. The reduced efficacy effect when co-formulated appears to be a result of an antagonism between the actives. This antagonism seems not to be merely a physical formulation incompatibility (though physical incompatibility may also be present and contribute to lower than expected performance), but the result of a biological/biochemical antagonism having complex mechanisms. Such antagonisms can practically interfere with what would otherwise be advantageous co-formulations of agrochemical actives. It may be possible to overcome this difficulty by spraying with each active separately, with a suitable time interval, or by using additional or special crop oil adjuvants, but all of this adds cost.

One area where antagonism is commercially important is between selective broadleaf herbicides and graminicides (postemergent grass herbicides), the data suggests physical interaction between differing forms of the active ingredients and complex interactions between salt and acid forms of either or both herbicides with a resulting change in the absorption or uptake of the graminicide into the target. In some cases doubling of graminicide rates were required to effect grass control.

A particular form of this antagonism arises in growing herbicide, particularly glyphosate, resistant crops, where glyphosate is used as a general herbicide with benefit to the desired crop precisely because of its glyphosate resistance. Rotating such crops means that glyphosate is ineffective in suppressing a resistant crop growing as volunteer plants in the succeeding (different but still glyphosate resistant) crop, potentially undermining the main advantage in using herbicide tolerant crop species. This problem can be met by using combinations of herbicides, typically glyphosate to suppress general weeds and another herbicide, to suppress the volunteer (glyphosate resistant) prior crop. Thus growing glyphosate resistant soya in succession to glyphosate resistant maize, it is possible to use a combination of glyphosate and a graminicide such as clethodim, a herbicide effective against grasses, including maize, but not herbicidally active against broadleaved plants such as soya. Unfortunately, while this combination can give the right activity profile to suppress volunteer (glyphosate resistant) maize and general weeds in (glyphosate resistant) soya, glyphosate and clethodim can be antagonistic to each other, particularly when co-applied in a single spray formulation, reducing overall effectiveness. A similar antagonism has been noted between glufosinate and clethodim type herbicides. Further similar antagonism has been noted with some broadleaf herbicides such as bentazon, bromoxynil and 2,4-D amine with graminicides including clethodim, quizalofop and sethoxydim.

Conventional non-ionic surfactant adjuvants, at application rates common for such adjuvants, appear to be relatively ineffective in boosting combined herbicide performance to overcome such antagonism between the actives.

Many agricultural pesticides, including insecticides, fungicides, herbicides, miticides, and plant growth regulators, are applied in the form of a liquid composition. In addition to the pesticide, such liquid compositions typically include one or more compounds intended to improve one or more properties of the liquid composition, such as for example, storage stability, ease of handling, and/or pesticide efficacy against target organisms.

The present invention seeks to provide the use of compounds in agrochemical compositions in combination with an agrochemical active, where the compounds may provide desired adjuvancy. The present invention also seeks to provide the use of agrochemical concentrates and dilute formulations comprising said adjuvants.

According to a first aspect of the present invention there is provided an agrochemical formulation comprising;
  i) a first adjuvant, where said first adjuvant is a fatty ester of a $C_3$ to $C_8$ polyol, or an oligomer thereof having from 2 to 5 repeat units;
  ii) a co-adjuvant, where said co-adjuvant is an alkoxylated fatty alcohol having a $C_4$ to $C_{30}$ fatty chain and comprising from 1 to 30 oxyalkylene groups;
  iii) at least one agrochemical active.

According to a second aspect of the present invention there is provided a concentrate formulation suitable for making an agrochemical formulation of the first aspect, said concentrate comprising;
  i) a first adjuvant, where said first adjuvant is a fatty ester of a $C_3$ to $C_8$ polyol, or an oligomer thereof having from 2 to 5 repeat units;
  ii) a co-adjuvant, where said co-adjuvant is an alkoxylated fatty alcohol having a $C_4$ to $C_{30}$ fatty chain and comprising from 1 to 30 oxyalkylene groups;
  iii) optionally, at least one agrochemical active.

According to a third aspect of the present invention there is provided the use of a combination of;
  i) a first adjuvant, where said first adjuvant is a fatty ester of a $C_3$ to $C_8$ polyol, or an oligomer thereof having from 2 to 5 repeat units; and
  ii) a co-adjuvant, where said co-adjuvant is an alkoxylated fatty alcohol having a $C_4$ to $C_{30}$ fatty chain and comprising from 1 to 30 oxyalkylene groups;

as adjuvants in an agrochemical formulation comprising at least one agrochemical active.

According to a fourth aspect of the present invention there is provided a method of treating vegetation to control pests, the method comprising applying a formulation of the first aspect, and/or a diluted concentrate formulation of the second aspect, either to said vegetation or to the immediate environment of said vegetation.

It has been found that the combination of a fatty ester of a $C_3$ to $C_8$ polyol or polyol oligomer with an alkoxylated fatty alcohol having a $C_4$ to $C_{30}$ fatty chain and comprising from 1 to 30 oxyalkylene groups provides for desired adjuvancy properties when used in an agrochemical formulation having at least one agrochemical active.

As used herein, the terms 'for example,' 'for instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that, when describing the number of carbon atoms in a substituent group (e.g. '$C_1$ to $C_6$ alkyl'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

The first adjuvant is a fatty ester of a $C_3$ to $C_8$ polyol, or oligomer thereof having from 2 to 5 repeat units, and may have a general structure (I):

wherein:
P is the residue of a $C_3$ to $C_8$ polyol, or residue of an oligomer thereof having from 2 to 5 repeat units, each said polyol having m active hydrogen atoms, where m is an integer in the range from 2 to 7;
each $R^1$ independently represents hydrogen, a $C_1$ to $C_{28}$ hydrocarbyl, or an alkanoyl group represented by —C(O)$R^2$ wherein $R^2$ represents a $C_8$ to $C_{28}$ hydrocarbyl; and
wherein at least one $R^1$ group is or comprises an alkanoyl group represented by —C(O)$R^2$.

The fatty ester of a $C_3$ to $C_8$ polyol, or oligomer thereof having from 2 to 5 repeat units, is preferably non-ionic.

The term polyol is well known in the art, and refers to an alcohol comprising more than one hydroxyl group. The term 'active hydrogen' refers to the hydrogen atoms present as part of the hydroxyl groups of the $C_3$ to $C_8$ polyol P. Therefore, it will be understood that the integer m, being the number of active hydrogens in said $C_3$ to $C_8$ polyol, is equivalent to the number of hydroxyl groups present for each $C_3$ to $C_8$ polyol.

The term 'polyol residue' as used herein, unless otherwise defined, refers to an organic radical derived from polyol by removal of m active hydrogen atoms, each hydrogen atom being from one of the hydroxyl groups present.

The polyol residue is a $C_3$ to $C_8$ polyol residue, i.e. formed from a $C_3$ to $C_8$ polyol. More preferably, a $C_3$ to $C_7$ polyol residue, particularly $C_3$ to $C_6$ polyol residues.

The polyol residue may also be a residue of an oligomer of a $C_3$ to $C_8$ polyol, said oligomer having from 2 to 5 repeat units of the monomer polyol. Preferably, said oligomers have from 2 to 4 repeat units. More preferably, from 2 to 3 repeat units.

Where the polyol is a residue of an oligomer of a $C_3$ to $C_8$ polyol, the oligomer may be a homogeneous oligomer formed from identical monomer polyol units, or may be heterogeneous being formed from a number of different $C_3$ to $C_8$ polyol monomer units.

Particularly suitable polyol oligomers may be selected from diglycerol, triglycerol, tetraglycerol, dierythritol, trierythritol, tetraerythritol, di-1,3-propanediol, tri-1,3-propanediol, di(trimethylolpropane), or tri(trimethylolpropane). Preferably, said oligomer is selected from diglycerol, triglycerol, tetraglycerol, di(trimethylolpropane), or tri(trimethylolpropane). More preferably, said oligomer is selected from diglycerol, triglycerol, di(trimethylolpropane), or tri (trimethylolpropane). Most preferably, said oligomer may be diglycerol or di(trimethylolpropane).

It will be understood that features detailed with regard to polyols, such as the values of m and groups $R^1$, will apply to the oligomeric polyols and be multiplied up by the relevant number of repeat units of said oligomer, whilst accounting for moles of removed water or ether bridges.

The polyol may be linear, branched, partially cyclic, or cyclic.

The index m is a measure of the alcohol functionality of the polyol, and the fatty ester —C(O)$R^2$ will replace some or all of the active hydrogen atoms (dependent on the reaction conditions). It is possible that esterification at a particular site may be restricted or prevented by steric hindrance.

The polyols used in the present invention have a value of m active hydrogen atoms in the range from 2 to 7. Preferably, the value of m is in the range from 2 to 6. More preferably, in the range from 3 to 5.

As the number of hydroxyl groups present on the polyol is equivalent to the number of m active hydrogen atoms, the preferred numbers of hydroxyl groups present will be the same as listed for the preferred numbers of m active hydrogen atoms.

The polyol residue may be homogeneous in that it comprises only one specific polyol residue and is formed from one specific polyol. In an alternative embodiment, the polyol residue starting material may be heterogeneous in that it comprises a mixture of a number of different polyols have different values of m selected from those listed above, and therefore the polyol residue formed therefrom may be heterogeneous.

The polyol may be selected from diols, triols, tetrols, pentols, hexols, heptols, or octols. Preferably, the polyol may be selected from triols, tetrols, pentols, hexols, or heptols. More preferably, the polyol may be selected from triols, tetrols, or hexols.

Suitable specific polyols may be selected from ethylene glycol, isosorbide, 1,3-propanediol, propylene glycol, trimethylolpropane, trimethylolethane, glycerol, triglycerol, erythritol, threitol, pentaerythritol, sorbitan, arabitol, xylitol, ribitol, fucitol, mannitol, sorbitol, sucrose, maltose, galactitol, iditol, inositol, volemitol, isomalt, maltitol, or lactitol.

In one particular embodiment, polyols obtainable from natural sources may be preferred. In particular, sugar alcohols may be used to form the polyol residue. In this specification the terms 'sugars' and 'sugar alcohols' refer to a group of saccharide derived polyols having from 4 to 7 hydroxyl groups. Examples of preferred sugars and sugar alcohols may include monosaccharides and disaccharides having from 4 to 7 hydroxyl groups. Residues of monosaccharide, more preferably of glucose, fructose or sorbitol, and particularly of sorbitol or sorbitan, may be preferred as polyols obtained from natural sources.

Particularly preferred polyol residues are those wherein m represents a value of 3, 4, or 6, and where said residues are $C_3$ to $C_6$ polyol residues. Most preferably, the polyol residue is formed from glycerol, sorbitol, sorbitan, or oligomers thereof.

The $C_1$ to $C_{28}$ hydrocarbyl may preferably be selected from a $C_1$ to $C_{28}$ alkyl or a $C_1$ to $C_{28}$ alkenyl.

The term 'alkyl' as used herein, unless otherwise defined, refers to saturated hydrocarbon radicals being straight chain, branched, or combinations thereof, containing from 1 to 28 carbon atoms. Preferably, the alkyls each contain from 5 to 26 carbon atoms. More preferably, 10 to 24 carbon atoms. Most preferably, 16 to 22 carbon atoms.

Examples of alkyl radicals may be independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, or branched variants thereof.

The alkyl radicals may preferably be selected from dodecyl, tridecyl, tetradecyl, pentadecyl, hexadecyl, heptadecyl, octadecyl, nonadecyl, eicosyl, or branched variants thereof.

The term 'alkenyl' as used herein, unless otherwise defined, refers to hydrocarbon radicals having at least one or a plurality, preferably no more than four, double bonds. The alkenyl radicals may be straight chain, or branched moieties, or combinations thereof.

The alkenyl radicals may each contain from 2 to 28 carbon atoms. Preferably, the alkenyls each contain from 5 to 26 carbon atoms. More preferably, 10 to 24 carbon atoms. Most preferably, 16 to 22 carbon atoms.

Examples of alkenyl radicals may be independently selected from ethyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenenyl henicosenyl, docosenyl, tricosenyl, tetracosenyl, pentacosenyl, hexacosenyl, heptacosenyl, octacosenyl, or branched variants thereof.

The alkenyl radicals may preferably be selected from dodecenyl, tridecenyl, tetradecenyl, pentadecenyl, hexadecenyl, heptadecenyl, octadecenyl, nonadecenyl, eicosenyl, or branched variants thereof.

At least one of the $R^1$ groups present represents an alkanoyl group represented by $—C(O)R^2$ in which $R^2$ will represent a $C_8$ to $C_{28}$ hydrocarbyl. Said alkanoyl group may preferably be a residue of a fatty acid.

The $C_8$ to $C_{28}$ hydrocarbyl is preferably selected from a $C_8$ to $C_{28}$ alkyl or $C_8$ to $C_{28}$ alkenyl. More preferably, a $C_8$ to $C_{14}$ alkyl or $C_{12}$ to $C_{24}$ alkenyl. Most preferably, a $C_8$ to $C_{12}$ alkyl or $C_{16}$ to $C_{20}$ alkenyl.

Said $C_8$ to $C_{28}$ alkyl or $C_8$ to $C_{28}$ alkenyls may be selected from the alkyl radicals and alkenyl radicals as listed herein having 8 to 28 carbon atoms. Said $C_8$ to $C_{28}$ alkyl or $C_8$ to $C_{28}$ alkenyls may also be selected such that the resulting ester is in a liquid state at room temperature and pressure. The chain lengths may be selected so that the viscosity of the first adjuvant is kept low and within desired values and the resulting is not a waxy.

The term 'residue of a fatty acid' as used herein refers to the moiety that is the resulting product of the fatty acid in a particular reaction scheme or subsequent formulation or chemical product, regardless of whether the moiety is actually obtained from the specified chemical species. A 'fatty acid residue' thereby refers to the moiety which results when a fatty acid participates in a particular reaction (i.e. the residue is a fatty alkanoyl group RC(O)—). The fatty acid residue is therefore 'derived' from the respective fatty acid. It is understood that this moiety can be obtained by a reaction with a species other than the specified fatty acid per se, for example, by a reaction with an unsaturated fatty acid chloride, ester, or anhydride.

The fatty acids used in the first adjuvant of the present invention are preferably selected from $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{22}$ fatty acids. Especially $C_{18}$ fatty acids may be preferred.

The fatty acids may be selected from linear or branched fatty acids. The fatty acids may be selected from saturated or unsaturated fatty acids.

Where unsaturated fatty acids are present, these may be selected from unsaturated fatty acids comprising at least one unsaturated carbon-carbon double bond. Particularly preferred are unsaturated fatty acids having in the range from 1 to 3 carbon-carbon double bonds. Most preferred are mono-unsaturated or di-unsaturated fatty acids residues. The carbon-carbon double bond(s) of the fatty chain may be present either in a cis or a trans configuration.

Preferably, the fatty acids residues used are derived from linear mono-unsaturated or di-unsaturated fatty acids. The preferred fatty acids may also comprise some tri-unsaturated fatty acids as it has been found that addition may improve cold liquid stability properties.

Iodine values are understood to represent the average amount of unsaturation of fats or oils, and is expressed in terms of the number of centigrams of iodine absorbed per gram of sample (% iodine absorbed). Where unsaturated fatty acids are present, said fatty acids may be selected such that the iodine value is greater than 70. Preferably, said iodine value is greater than 90. More preferably, said iodine value is greater than 100. Most preferably, said iodine value is greater than 110.

Suitable saturated fatty acids may be selected from caprylic acid, capric acid, lauric acid, myristic acid, palmitic acid, stearic acid, arachidic acid, behenic acid, or lignoceric acid. Preferred saturated fatty acids may be selected from caprylic acid, capric acid, lauric acid, or myristic acid.

Suitable unsaturated fatty acids may be selected from myristoleic acid, palmitoleic acid, sapienic acid, oleic acid, elaidic acid, vaccenic acid, linoleic acid, linoelaidic acid, arachidonic acid, eicosapentaenoic acid, erucic acid, or docosahexaenoic acid. Preferred unsaturated fatty acids may be selected from oleic acid, linoleic acid, linolenic acid, palmitoleic acid, or elaidic acid. Particularly preferred unsaturated fatty acids may be oleic acid, linoleic acid, and mixtures thereof.

The fatty acids may be unsaturated fatty acid mixtures obtained from natural fats and oils, e.g. canola oil, sunflower oil, soybean oil, olive oil, cotton seed oil, grape seed oil, peanut oil, rapeseed oil, safflower oil, cottonseed oil, or tall oil. Preferably canola oil, safflower oil, soybean oil, or tall oil.

In an alternative embodiment, the fatty acid used may be purified prior to use in the present invention. Purification may be undertaken to raise the levels of desired fatty acid chains and reduce the level of undesired fatty acid chains in order to modify the iodine values, titre values, or pour points.

Particularly suitable fatty esters of $C_3$ to $C_8$ polyols or oligomers thereof include glycerol, diglycerol, or sorbitan esters of oleic acid, elaidic acid, linoleic acid, or erucic acid The fatty esters of $C_3$ to $C_8$ polyols or oligomers of the present invention may be esterified at any of the m active hydrogen sites on the polyol thereby providing mono ester or poly esterified polyols. Said polyols may therefore be partially or fully esterified. Preferably, said polyols are partial esters which remain insoluble in water.

The fatty esters of $C_3$ to $C_8$ polyols or oligomers of the present invention may be esterified at between 25 to 75% of the m active hydrogen sites on the polyol. Preferably, 35 to 65% of the m active hydrogen sites. More preferably, 40 to 60% of the m active hydrogen sites. Most preferably, around 50% of the m active hydrogen sites.

The fatty esters of $C_3$ to $C_8$ polyol used in the present invention preferably comprise a mixture of mono-, di-, tri-, and optionally tetra-, esters. The concentration of monoesters is suitably at least 20%, preferably at least 25%, more preferably at least 30%, particularly at least 35%, and especially at least 40% by weight based upon the total concentration of fatty esters of $C_3$ to $C_8$ polyol. The concentration of the combination of monoesters and diesters is suitably at least 50%, preferably at least 65%, more preferably at least 75%, particularly at least 80%, and especially at least 85% by weight based upon the total concentration of fatty esters of $C_3$ to $C_8$ polyol. Correspondingly, the concentration of tri- and tetra-esters is suitably not more than 50%, preferably not more than 35%, more preferably not more than 25%, particularly not more than 20%, and especially not more than 15% by weight based upon the total concentration of fatty esters of $C_3$ to $C_8$ polyol. In particular, the preferred amounts of mono-, di-, tri-, and optionally tetra-, esters may preferably be for monomeric polyol esters.

The fatty esters of $C_3$ to $C_8$ polyol or oligomers thereof preferably have a hydrophilic-lipophilic balance (HLB) value, as calculated by Griffin's method, of less than 10, more preferably less than 8, and most preferably less than 7. The fatty esters of $C_3$ to $C_8$ polyol component suitably has a HLB value in the range from 1 to 8, preferably 2 to 6, more preferably 3 to 5.

The fatty esters of $C_3$ to $C_8$ polyol or oligomers thereof preferably have an HLB value of less than 10, more preferably less than 8, and most preferably less than 7. The fatty esters of $C_3$ to $C_8$ polyol component suitably has a HLB value in the range from 1 to 8, preferably 2 to 6, more preferably 3 to 5.

In particular, the HLB of the first adjuvant may be in the range 4 to 5 where the fatty esters of $C_3$ to $C_8$ polyol or oligomer thereof is based on $C_6$ sugar alcohols. In an alternative embodiment where the fatty esters of $C_3$ to $C_8$ polyol or oligomer thereof is based on $C_3$ polyols, the HLB may be less than 4.

Specific preferred examples of fatty esters of $C_3$ to $C_8$ polyol or oligomers thereof may be selected from sorbitan mono-oleate, glycerol mono-oleate, sorbitan sesquioleate, sorbitan di-oleate, sorbitan tri-oleate, glycerol ester of tall oil or diglycerol ester of tall oil, glycerol ester of canola oil or diglycerol ester of canola oil, glycerol ester of safflower oil or diglycerol ester of safflower oil, glycerol ester of soy oil or diglycerol ester of soy oil, di-glycerol oleate, tri-glycerol oleate, di-glycerol isostearate, or tri-glycerol isostearate.

The first adjuvant may preferably be liquid at room temperature and pressure. Most preferably, the first adjuvant is liquid and remain as liquid and free from suspended solids in the sprayable agrochemical formulation at temperatures down to 0° C. for at least 24 hours.

The first adjuvant may also have low or no aquatic toxicity, and be acceptable for food use. Specifically, the adjuvant may be selected from those which avoid classification as hazardous under the Globally Harmonized System (GHS), that are acceptable for organic production as defined by the USDA National Organic Program, and/or that are acceptable for use as additives to food as defined by the US Food and Drug Administration, the UN WHO Joint Expert Committee on Food Additives (JECFA) or related EU food safety regulations.

The first adjuvant may preferably be non-self-emulsifiable. Said adjuvant may therefore need to be emulsified, and said emulsification may be achieved by mechanical action, such as homogenisation, or by addition of an emulsifier compound.

The co-adjuvant present in the agrochemical formulation is an alkoxylated fatty alcohol co-adjuvant having a $C_4$ to $C_{30}$ fatty chain and comprising from 1 to 30 oxyalkylene groups;

In a one embodiment the co-adjuvant is an alkoxylated alcohol of the general formula:

$$R^3\text{—O-(AO)}_x\text{—H} \qquad (II)$$

wherein $R^3$ is a straight or branched chain, saturated or unsaturated, substituted or unsubstituted hydrocarbon group having from 4 to 30 carbon atoms;

AO is an oxyalkylene group; and x represents an integer in the range from 1 to 30.

The oxyalkylene groups (AO) may be selected from groups of the formula —$(C_yH_{2y}O)$— where y is an integer selected from 2, 3, or 4. Preferably, y is 2 or 3.

The oxyalkylene group AO may be selected from oxyethylene, oxypropylene, oxybutylene, or oxytetramethylene. Preferably, the oxyalkylene group is selected from oxyethylene (EO) and/or oxypropylene (PO).

Where the oxyalkylene chain is homopolymeric, homopolymers of ethylene oxide or propylene oxide are preferred. More preferably, homopolymers of ethylene oxide are particularly preferred.

Where there is more than one oxyalkylene group present (i.e. where x is 2 or more) and at least two are part of the same oxyalkylene chain, the oxyalkylene groups may be the same or may be different along said oxyalkylene chain. In this embodiment, the oxyalkylene chain may be a block or random copolymer of differing oxyalkylene groups.

Where the viscosity of the formulation needs to be lowered, block or random copolymer of differing oxyalkylene groups in the alkoxylated fatty alcohol may be particularly preferred.

The number of oxyalkylene groups in each oxyalkylene chain (i.e. the value of the each parameter x) will be in the range from 1 to 30. Preferably, in the range from 2 to 25. More preferably, in the range from 3 to 10. Further preferably, in the range from 4 to 7.

The $C_4$ to $C_{30}$ hydrocarbyl may preferably be selected from a $C_4$ to $C_{30}$ alkyl or a $C_4$ to $C_{30}$ alkenyl.

The term 'alkyl' as used herein, unless otherwise defined, refers to saturated hydrocarbon radicals being straight chain, branched, or combinations thereof, containing from 4 to 30 carbon atoms. Preferably, the alkyls each contain from 6 to 24 carbon atoms. More preferably, 8 to 22 carbon atoms. Most preferably, 10 to 20 carbon atoms.

Examples of alkyl radicals may be independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, or branched variants thereof.

The alkyl radicals may preferably be selected from dodecyl, tridecyl, tetradecyl, pentadecyl, hexadecyl, heptadecyl, octadecyl, nonadecyl, eicosyl, or branched variants thereof.

The term 'alkenyl' as used herein, unless otherwise defined, refers to hydrocarbon radicals having at least one or a plurality, preferably no more than four, double bonds. The alkenyl radicals may be straight chain, or branched moieties, or combinations thereof.

The alkenyl radicals may each contain from 4 to 30 carbon atoms. Preferably, the alkenyls each contain from 5 to 26 carbon atoms. More preferably, 10 to 24 carbon atoms. Most preferably, 16 to 22 carbon atoms.

Examples of alkenyl radicals may be independently selected from ethyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenenyl henicosenyl, docosenyl, tricosenyl, tetracosenyl, pentacosenyl, hexacosenyl, heptacosenyl, octacosenyl, or branched variants thereof.

The alkyl radicals may preferably be selected from dodecenyl, tridecenyl, tetradecenyl, pentadecenyl, hexadecenyl, heptadecenyl, octadecenyl, nonadecenyl, eicosenyl, or branched variants thereof.

More preferably, $R^3$ may be derived from, and the residue of a fatty alcohol.

Where $R^3$ is derived from a fatty alcohol, $R^3$ represents an alkoxy group (R—O—) being a residue of a fatty alcohol.

The term 'residue of a fatty alcohol' as used herein refers to the moiety that is the resulting product of the fatty alcohol in a particular reaction scheme or subsequent formulation or chemical product, regardless of whether the moiety is actually obtained from the specified chemical species. A 'fatty alcohol residue' thereby refers to the moiety which results when a fatty alcohol participates in a particular reaction (i.e. the residue is a fatty alkoxy group R—O—). The fatty alcohol residue is therefore 'derived' from the respective fatty alcohol. It is understood that this moiety can be obtained by a reaction with a species other than the specified fatty alcohol per se, for example, by a reaction with an unsaturated fatty alcohol chloride, ester, or anhydride.

The fatty alcohols may preferably be selected from $C_4$ to $C_{30}$ fatty alcohols, more preferably $C_6$ to $C_{24}$ fatty alcohols, particularly $C_{10}$ to $C_{22}$ fatty alcohols, further preferably $C_{10}$ to $C_{16}$ fatty alcohols, and especially $C_{12}$ fatty alcohols.

The fatty alcohols may be selected from linear or branched fatty alcohols. The fatty alcohols may be selected from saturated or unsaturated fatty alcohols.

Where unsaturated fatty alcohols are present, these may be selected from unsaturated fatty alcohols comprising at least one unsaturated carbon-carbon double bond. Particularly preferred are unsaturated fatty alcohols having in the range from 1 to 3 carbon-carbon double bonds. Most preferred are mono-unsaturated fatty alcohols residues. The carbon-carbon double bond of the fatty chain may be present either in a cis or a trans configuration.

Preferably, the fatty alcohols residues used are derived from linear saturated fatty alcohols.

Suitable saturated and unsaturated fatty alcohols in particular may be selected from capryl alcohol pelargonic alcohol, capric alcohol, undecyl alcohol, lauryl alcohol, tridecyl alcohol, myristyl alcohol, pentadecyl alcohol, cetyl alcohol, palmitoleyl alcohol, heptadecyl alcohol, stearyl alcohol, nonadecyl alcohol, arachidyl alcohol, heneicosyl alcohol, or behenyl alcohol, oleyl alcohol, elaidyl alcohol, linoleyl alcohol, linolenyl alcohol, or erucyl alcohol.

In particular, unsaturated and saturated $C_{10}$ to $C_{16}$ fatty alcohols may be preferred. The fatty alcohols may preferably be selected from capric alcohol, lauryl alcohol, or myristyl alcohol.

Suitable non-ionic alkoxylates having utility in the context of the present invention may be selected from lauryl alcohol (4 EO) ethoxylate, lauryl alcohol (5 EO) ethoxylate, lauryl alcohol (6 EO) ethoxylate, oleyl (3 EO) ethoxylate, oleyl (5 EO) ethoxylate, or oleyl (10 EO) ethoxylate.

The non-ionic alkoxylates may in particular be selected from those which are miscible with the first adjuvant.

The first adjuvant of the present invention may be obtainable by esterifying a $C_3$ to $C_8$ polyol. Preferably, the fatty esters of $C_3$ to $C_8$ polyol may be obtained by esterifying a $C_3$ to $C_8$ polyol by any suitable method. Alternatively, the respective polyglyceride (for example triglyceride) may be trans-esterified to provide a mixture of mono and poly esterified polyol. The method may be adapted to provide higher concentrations of more preferred components.

Where oligomers of $C_3$ to $C_8$ polyols are use, the oligomers may be first formed by oligomerising the respective polyol monomer units, and the oligomer may then be esterified.

The step of esterification of the polyol or polyol oligomer may be undertaken by techniques well known in the art, for example by reacting the polyol or oligomer with the required amounts of fatty acid source under acidic or basic conditions. The polyol or oligomer therefore undergoes an esterification reaction with fatty acid. Preferably, the first adjuvant of the present invention may be obtained by directly esterifying a polyol or oligomer.

The method of forming the $C_3$ to $C_8$ polyol or oligomer esters may comprise using biologically derived fatty acids and polyols or oligomers. It can be seen that the components may be derived from biological materials, but the first adjuvant itself is formed by a chemical synthesis. This may result in greater reproducibility and more consistent product with greater purity. Synthesising the first adjuvant in this way allows for improved control of the process, and therefore improved control of the resultant properties such as viscosity and freezing point.

It can be seen that, depending on the particular reaction conditions, the polyol or oligomer may be partially or fully esterified. At least one of the active hydrogens m of the polyol or oligomer is esterified. Preferably, at least 1 or 2 of the active hydrogens m of the polyol or oligomer are esterified.

In a suitable embodiment of the invention, on average in the range from 1 to 2.5 of the $R^1$ groups comprise an alkanoyl group represented by —C(O)R². Preferably, on average in the range from, 1.2 to 1.8. Said average being measured across a bulk amount of the formed first adjuvant.

The molecular weight (weight average) of the first adjuvant is preferably in the range from 200 to 2200, more preferably 250 to 1900, particularly 330 to 1500, further preferably, 350 to 1270, and especially 370 to 950.

The method of making alkoxylated alcohol typically involves the reaction of a specified ratio of alkylene oxides with suitable fatty alcohol in the presence of an alkaline earth type or alternate catalyst with reaction at elevated temperature and pressure to form the desired adduct.

The molecular weight (weight average) of the co-adjuvant is preferably in the range from 120 to 1,760, more preferably 160 to 1,200, particularly 200 to 800, further preferably, 250 to 600, and especially 300 to 400.

The agrochemical formulation according to the present invention may also contain components, such as surfactant materials which form part of the emulsifier system. Said surfactants may include surfactant dispersants.

Suitable surfactants include relatively hydrophilic surfactants, e.g. having a HLB value of greater than 10, preferably greater than 12. The surfactants may alternatively be relatively hydrophobic surfactants being are surfactants which are not fatty esters of $C_3$ to $C_8$ polyol or oligomers thereof having 2-5 repeat units, and may have HLB values of less than 10, preferably less than 8.

Relatively hydrophilic surfactants include alkoxylate surfactants with an average in the range from about 10 to about 100 alkylene oxide, particularly ethylene oxide, residues; and relatively hydrophobic surfactants include alkoxylate surfactants preferably with an average in the range from about 3 to about 10 alkylene oxide, particularly ethylene oxide, residues.

Other suitable surfactants may be selected from those which may be emulsifying, readily miscible, non-gelling, readily dilutable, and/or dispersible.

One example of suitable surfactants may include polysorbates, for example poly alkoxylated sugar alcohol esters. Suitable examples of such surfactants may include typically non-ionic polymeric ether surfactants. The most commonly used examples are polysorbates such as polysorbate 20 and polysorbate 80 (sold under the Tween brand).

Agrochemically active compounds, in particular systemic insecticides and fungicides, require a formulation which allows the active compounds to be taken up by the plant/the target organisms.

The term 'agrochemical formulation' as used herein refers to compositions including an active agrochemical, and is intended to include all forms of compositions, including concentrates and spray formulations. If not specifically stated, the agrochemical formulation of the present invention may be in the form of a concentrate, a diluted concentrate, or a sprayable formulation.

The first and co-adjuvants may be combined with other components in order to form an agrochemical formulation comprising at least one agrochemical active.

Accordingly, agrochemical active compounds may be formulated as an emulsifiable concentrate (EC), emulsion concentrate (EW), suspension concentrate (SC), soluble liquid (SL), as an oil-based suspension concentrate (OD), and/or suspoemulsions (SE).

In an EC formulation and in an SL formulation, the active compound may be present in dissolved form, whereas in an OD, SC, or SE formulations the active compound may be present as a solid or emulsified liquid.

It is envisaged that the combination of first and co-adjuvants of the present invention will particularly find use in a SC, OD, or SE formulation.

The agrochemical formulation of the present invention may be in the form of a concentrate, a diluted concentrate, or a sprayable formulation.

Agrochemical concentrates are agrochemical compositions, which may be aqueous or non-aqueous, and which are designed to be diluted with water (or a water based liquid) to form the corresponding spray formulations. Said compositions include those in liquid form (such as solutions, emulsions, or dispersions) and in solid form (especially in water dispersible solid form) such as granules or powders.

Spray formulations are aqueous agrochemical formulations including all the components which it is desired to apply to the plants or their environment. Spray formulations can be made up by simple dilution of concentrates containing desired components (other than water), or by mixing of the individual components, or a combination of diluting a concentrate and adding further individual components or mixtures of components. Typically such end use mixing is carried out in the tank from which the formulation is sprayed, or alternatively in a holding tank for filling the spray tank. Such mixing and mixtures are typically termed tank mixing and tank mixtures.

The combination of the first and co-adjuvant may therefore be incorporated into the formulation of the agrochemical active compound (in-can formulation) or be added after dilution of the concentrated formulation of the spray liquor (tank-mix). To avoid dosage errors and to improve user safety during application of agrochemical products, it is advantageous to incorporate the adjuvants into the formulation. This also avoids the unnecessary use of additional packaging material for the tank-mix products.

According to the needs of the customer, concentrates thus formed may comprise typically up to 95 wt. % agrochemical actives. Said concentrates may be diluted for use resulting in a dilute composition having an agrochemical active concentration of about 0.5 wt. % to about 1 wt. %. In said dilute composition (for example, a spray formulation, where a spray application rate may be from 10 to 500 $l \cdot ha^{-1}$) the agrochemical active concentration may be in the range from about 0.001 wt. % to about 1 wt. % of the total formulation as sprayed.

The first and co-adjuvants of the present invention will typically be used either in an amount proportional to the amount of the active agrochemical in the formulation. In agrochemical formulation concentrates, the proportion of first adjuvant and co-adjuvant will depend on the solubility of the components in the liquid carrier. Typically, the concentration of first adjuvant and co-adjuvant in such a concentrate will be from 1 wt. % to 99 wt. %. Preferably, from 1 wt. % to 70 wt. %. More preferably, from 3 wt. % to 50 wt. %. Further preferably, from 5 wt. % to 30 wt. %. Most preferably, from 7 wt. % to 20 wt. %.

Upon dilution to form, for example, a spray formulation, the sum of the first adjuvant and co-adjuvant will typically be present at a concentration of from 0.01 wt. % to 2 wt. %, more usually from 0.03 wt. % to 0.5 wt. % of the spray formulation. Further preferably, from 0.12 wt. % to 0.4 wt. % of the spray formulation.

The ratio of first adjuvant and co-adjuvant to active agrochemical in the agrochemical formulation is preferably from about 0.1:1 to about 1:1. More preferably, from about 0.3:1 to about 0.8:1. This ratio range will generally be maintained for concentrate forms of formulations (e.g. where the adjuvants are included in a dispersible liquid concentrate or dispersible solid granule formulation), and in the spray formulations.

When concentrates (solid or liquid) are used as the source of active agrochemical and/or first adjuvant and co-adjuvant, the concentrates will typically be diluted to form the spray formulations. The dilution may be with from 1 to 10,000, particularly 10 to 1,000, times the total weight of the concentrate of water to form the spray formulation.

Where the agrochemical active is present in the aqueous end use formulation as solid particles, most usually it will be present as particles mainly of active agrochemical. However, if desired, the active agrochemical can be supported on a solid carrier e.g. silica or diatomaceous earth, which can be solid support, filler or diluent material as mentioned above.

Where the dispersed phase is a non-aqueous liquid, said liquid will typically be an oil. The oil may be or include a mineral oil, including aliphatic (paraffin) mineral oils and aromatic mineral or synthetic oils, such as those sold under the trade name Solvesso; an optionally hydrogenated vegetable oil, such as an optionally hydrogenated cotton seed oil, linseed oil, mustard oil, neem oil, niger seed oil, oiticica oil, olive oil, palm oil, palm kernel oil, peanut oil, perilla oil, poppy seed oil, rape seed oil, safflower oil, sesame oil, or soybean oil; an ester oil (a synthetic ester oil), especially a $C_{16}$ ester of a $C_8$ to $C_{22}$ fatty acid, especially a $C_{12}$ to $C_{18}$ fatty acid, or a mixture of esters, such as methyl laurate, 2-ethylhexyl laurate, heptadecanoate, heptadecenoate, heptadecadienoate, stearate or oleate, and in particular methyl laurate and oleate; N-methylpyrrolidone; or an isoparaffin; or a mixture of such oils.

The spray formulations will typically have a pH within the range from moderately acidic (e.g. about 3) to moderately alkaline (e.g. about 10), and particular near neutral (e.g. about 5 to 8). More concentrated formulations will have similar degrees of acidity/alkalinity, but as they may be largely non-aqueous, pH is not necessarily an appropriate measure of this.

The agrochemical formulation may include solvents (other than water) such as monopropylene glycol, oils which can be vegetable or mineral oils such as spray oils (oils included in spray formulations as non-surfactant adjuvants), associated with the first and co-adjuvants. Such solvents may be included as a solvent for either the first adjuvant, co-adjuvant, or both, and/or as a humectant, e.g. especially propylene glycol. When used such solvents will typically be included in an amount of from 5 wt. % to 500 wt. %, desirably 10 wt. % to 100 wt. %, by weight of the sum of the first and co-adjuvants. Such combinations can also include salts such as ammonium chloride and/or sodium benzoate, and/or urea especially as gel inhibition aids.

The agrochemical formulation may also include;
preservatives and/or anti-microbials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the composition; and/or
antifoam agents e.g. polysiloxane antifoam agents, typically in amounts of 0.005 wt. % to 1 wt. % of the composition.

Other adjuvants, particularly surfactant adjuvants, may be included in the compositions and formulations of and used in this invention. Examples include alkylpolysaccharides (more properly called alkyl oligosaccharides); fatty amine ethoxylates e.g. coconut alkyl amine 2EO; sorbitan and sorbitol ethoxylate derivatives, such as those sold under the trade names Atlox and Tween by Croda Europe Limited; and derivatives of alk(en)yl succinic anhydride, in particular those described in PCT applications WO 94/00508 and WO 96/16930.

The agrochemical formulations may also include other components including:
binders, particularly binders which are readily water soluble to give low viscosity solutions at high binder concentrations, such as polyvinylpyrrolidone; polyvinyl alcohol; carboxymethyl cellulose; gum arabic; sugars e.g. sucrose or sorbitol; starch; ethylene-vinyl acetate copolymers, sucrose and alginates,
diluents, absorbents or carriers such as carbon black; talc; diatomaceous earth; kaolin; aluminium, calcium or magnesium stearate; sodium tripolyphosphate; sodium tetraborate; sodium sulphate; sodium, aluminium and mixed sodium-aluminium silicates; and sodium benzoate,
disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;
wetting agents such as alcohol ethoxylate and alcohol ethoxylate/propoxylate wetting agents;
dispersants such as sulphonated naphthalene formaldehyde condensates and acrylic copolymers such as the comb copolymer having capped polyethylene glycol side chains on a polyacrylic backbone;
emulsifiers such as alcohol ethoxylates, ABA block co polymers, or castor oil ethoxylates;
antifoam agents, typically at a concentration of from 1 to 10% by weight of the granule; and
viscosity modifiers such as commercially available water soluble or miscible gums, e.g. xanthan gums, and/or cellulosics, e.g. carboxy-methyl, ethyl or propylcellulose.

Suitable agrochemical actives for use in the formulations according to the invention are all agrochemically active compounds, preferably those which are solid at room temperature. It is envisaged that the adjuvant combination of the present invention would have broad applicability to all types of agrochemical actives.

Agrochemical actives refer to biocides which, in the context of the present invention, are plant protection agents, more particular chemical substances capable of killing different forms of living organisms used in fields such as medicine, agriculture, forestry, and mosquito control. Also counted under the group of biocides are so-called plant growth regulators.

Biocides for use in agrochemical formulations of the present invention are typically divided into two sub-groups:
pesticides, including fungicides, herbicides, insecticides, algicides, moluscicides, miticides and rodenticides, and
antimicrobials, including germicides, antibiotics, antibacterials, antivirals, antifungals, antiprotozoals and antiparasites.

In particular, biocides selected from insecticides, fungicides, or herbicides may be particularly preferred.

The term 'pesticide' will be understood to refer to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical compositions according to the present invention are given.

A fungicide is a chemical control of fungi. Fungicides are chemical compounds used to prevent the spread of fungi in gardens and crops. Fungicides are also used to fight fungal infections. Fungicides can either be contact or systemic. A contact fungicide kills fungi when sprayed on its surface. A systemic fungicide has to be absorbed by the fungus before the fungus dies.

Examples for suitable fungicides, according to the present invention, encompass the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper (II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, fluotrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitrostyrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

An herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat.

Suitable herbicides may be selected from the group comprising: aryloxycarboxylic acid e.g. MCPA, aryloxyphenoxypropionates e.g. clodinafop, cyclohexanedione oximes e.g. sethoxydim, hydroxybenzonitriles e.g. bromoxynil, sulphonylureas e.g. nicosulphuron, triazolopyrimidines e.g. penoxsulam, triketiones e.g. mesotriones, triazine herbicides such as metribuzin, hexaxinone, or atrazine; sulphonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxyacetic acids; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; and/or dihalobenzonitrile herbicides such as bromoxynil, or ioxynil, benzoic acid herbicides, dipyridilium herbicides such as paraquat.

Particularly preferred herbicides may be selected from 2,4-dichlorophenoxyacetic acid (2,4-D), atrazine, dicamba as benzoic acid, glyphosate, glufosinate, imazapic as imidazolinone, metolachlor as chloroacetamide, picloram, clopyralid, and triclopyr as pyridinecarboxylic acids or synthetic auxins, their respective water soluble salts and esters, and mixtures thereof.

An insecticide is a pesticide used against insects in all developmental forms, and include ovicides and larvicides used against the eggs and larvae of insects. Insecticides are used in agriculture, medicine, industry and the household.

Suitable insecticides may include those selected from: chlorinated insecticides such as, for example, Camphechlor, DDT, Hexachloro-cyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures; organophosphorous compounds such as, for example, Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture; carbamates such as, for example, Aldicarb, Carbofuran, Carbaryl, Methomyl, 2-(1-Methylpropyl) phenyl methylcarbamate and their mixtures; pyrethroids such as, for example, Allethrin, Bifenthrin, Deltamethrin, Permethrin, Resmethrin, Sumithrin, Tetramethrin, Tralomethrin, Transfluthrin and their mixtures; plant toxin derived compounds such as, for example, Derris (rotenone), Pyrethrum, Neem (Azadirachtin), Nicotine, Caffeine and their mixture; neonicotinoids such as imidacloprid; abamectin e.g. emamactin; oxadiazines such as indoxacarb; and/or anthranilic diamides such as rynaxypyr.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Particularly preferred are agrochemical formulations comprising two or more agrochemical actives, particularly in combination systems, to counteract the antagonism between different types of agrochemical active.

Formulations comprising agrochemicals actives with herbicides having differing weed control effects are preferred, particularly combinations of;
a non-selective herbicide and another agrochemical active, more particularly another type of herbicide, especially a selective herbicide;
a selective herbicide and a graminicide particularly a non-selective herbicide;
a selective broadleaf herbicide and a graminicide, which may be either an ACCase inhibitor, or a non-selective herbicide; and/or
a selective graminicide, particularly an ACCase inhibitor used in combination with a non-selective herbicide.

As is noted above the invention finds particular use in combination systems of non-selective herbicides with selective graminicides. Non-selective herbicides will be understood as those which kill all weeds. A preferred non-selective herbicide will be glyphosate. Glyphosate type herbicides are widely used agrochemicals and usually take the form of salts, particularly alkali metal, especially sodium or potassium, or amine, particularly iso-propylamine, ammonium or trimesium (trimethylsulphonium), salts. These salts are highly water soluble and glyphosate is usually supplied for use as a concentrated solution in water typically at from 10 wt. % to 60 wt. %, particularly 25 wt. % to 50 wt. %, and especially 30 wt. % to 50 wt. %.

Selective herbicides will be understood as those which only kill selected weeds, such as broad leafed plants like dandelion, an example being the well-known herbicide 2,4-D. Particularly preferred selective herbicides which may be combined with the non-selective herbicides are selective graminicides.

Selective herbicides may be selected from quizalofop-p, fenoxaprop, fluazifop-p, sethoxydim, clethodim, saflufenacil, and/or tembotrione. Particularly preferred selective herbicides are selected from clethodim, tembotrione, and/or saflufenacil. Most preferably, clethodim.

Cyclohexanedione (lipid inhibitor) selective herbicides are active against grasses and are oil soluble compounds with clethodim typically provided as a solution in a suitable organic solvent commonly in hydrocarbon solvent such as Aromatic or Solvesso 150 fluids from Shell, or other solvents/cosolvents such as dimethyl fatty alkylamides, at concentrations of active in solution of from 50 g·l$^{-1}$ to 500 g·l$^{-1}$, particularly 60 g·l$^{-1}$ to 480 g·l$^1$, and especially 120 g·l$^{-1}$ to 360 g·l$^{-1}$.

Preferably, the agrochemical formulation will comprise an agrochemical active combination of glyphosate and clethodim, glyphosate and tembotrione, or glyphosate and saflufenacil. More preferably, glyphosate and clethodim.

The invention further includes a method of treating plants using formulations including at least one agrochemical and the first adjuvant and co-adjuvant of the first aspect. The agrochemical may be one or more phytoactives, for example growth regulators and/or herbicides, and/or pesticides, for example insecticides, fungicides or acaricides.

Accordingly the invention further includes methods of use including:
a method of killing or inhibiting vegetation by applying to the vegetation, or the immediate environment of the vegetation e.g. the soil around the vegetation, a spray formulation including at least one dispersed phase agrochemical and the first adjuvant and co-adjuvant of the first aspect; and/or
a method of killing or inhibiting pests of plants by applying to the plants or the immediate environment of the plants e.g. the soil around the plants, a spray formulations including at least one dispersed phase agrochemical which is one or more pesticides, for example insecticides, fungicides or acaricides, and the first adjuvant and co-adjuvant of the first aspect.

The combination of the first and co-adjuvants of the present invention will provide adjuvancy to the agrochemical formulation in which they are comprised.

As used herein, the term 'adjuvant' or 'adjuvancy' refers to compounds which when added to an agrochemical formulation will improve the agrochemical's desired effect. The adjuvant may affect the diluent, the mixture, the active, or the target by its improvements of the active's performance. An adjuvant can be used to;

adhere the pesticide on the area where the pesticide is functional;

change the epidermal layer of the leaf surface permitting pesticide entry; and/or attract the target pest to the pesticide as when used as a food for the pest in baits.

Specific adjuvancy effects may include surfactants, oils, compatibility agents, buffering and conditioning agents, defoaming agents, deposition agents, drift control agents, thickeners, spreaders (wetters), stickers (builders and extenders), emulsifiers (dispersants and suspending agents), plant penetrants, translocators, emulsifiable oils, compatibility agents, buffers, inverting agents, soil penetrants, and/or stabilising agents (UV filters).

Preferably, the first adjuvant and co-adjuvant of the present invention may find use as compatibility agents, particularly in combination systems to counteract the antagonism between different types of agrochemical active. Specifically we envisage their use in formulations including when the agrochemicals are herbicides having differing weed control effects, particularly combinations of a non-selective herbicide and another agrochemical active where there may otherwise be antagonism.

The contact angle of an agrochemical formulation represents a profile measurement of a drop of the formulation when in contact with a solid surface. When a surfactant is added to water the surface tension of the solution is reduced and the droplet is therefore able to spread out over a greater leaf area. This flatter droplet has a lower contact angle. It is typically understood that a water droplet has a contact angle of 93°, whilst a solution including a desired wetter adjuvant will have a contact angle of 50° or less.

The contact angle of the agrochemical formulation of the present invention is preferably less than 40°. More preferably, less than 38°. Most preferably, less than 35°.

The method of determining contact angle is as described herein and at a total combined concentration of first adjuvant and co-adjuvants of 0.10 wt. %.

Surface tension is a condition that exists at the free surface of a liquid. The surface tension test measures the force required to pull a floating ring off of the surface of a liquid. This force is measured in dynes/cm (equivalent to mN/m), and water typically has a value of 74 dyn/cm. Typically surfactants will lower the surface tension value resulting in better leaf coverage.

The surface tension of the agrochemical formulation of the present invention is preferably less than 40 mN/m. More preferably, less than 32 mN/m. Most preferably, less than 29 mN/m.

The method of determining surface tension is as described herein and at a total combined concentration of first adjuvant and co-adjuvants of 0.10 wt. %.

The adjuvants modify the viscosity of the resulting spray solutions, which in turn may increase droplet size and reduces the amount of drift susceptible fines. The viscosity of the agrochemical formulation of the present invention is preferably in the range from 20 mPa·s to 70 mPa·s. More preferably, in the range from 30 mPa·s to 60 mPa·s. Most preferably, in the range from 44 mPa·s to 52 mPa·s.

The method of determining viscosity is as described herein and at a total combined concentration of first adjuvant and co-adjuvants of 0.10 wt. %, at a temperature of 25° C., and at a shear rate of 100 s$^{-1}$.

The first and co-adjuvants of the present invention provide for desired stability of the resulting agrochemical formulations. The formulations do not undergo separation under storage. Additionally, the agrochemical formulations return to being homogeneous liquids at room temperature after being frozen.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

Compounds as used in the following examples are identified as follows:

A1—adjuvant combination of first adjuvant (mixture of mono and di oleate esters of diglyceride) and co-adjuvant (lauryl alcohol (4 EO) ethoxylate).

NP9—comparison non-ionic surfactant adjuvant nonoxynol-9.

The following test methods were used to determine corrosion performance of the adjuvant compositions.

Rheology (Stability from Separation Over Time)

The rheology was determined using a TA ARG2 Rheometer from TA Instruments. The rheology measurements were conducted at different temperatures 5° C., 10° C., 25° C., and 40° C.

Specific Gravity

This was measured at 20° C. and 25° C. for five lots of production material.

Intrinsic Solubility

The agrochemical formulation was formulated into oils and observed for solubility under specific conditions including: in spray oil 22 at 1 wt. % to form a quick break oil adjuvant; at 17 wt. % in spray oil 22 as a crop oil concentrate (COC); at 10 wt. % in B-100 biodiesel (Cargill or ADM) to form a modified vegetable oil or methylated seed oils (MSO); at 25% into Spray Oil 22 to form a minimum surfactant high surfactant oil (HSO); and at 40% into Spray Oil 22 22 to form a maximum surfactant HSO. Formulations were evaluated for separation after 2 weeks at ambient temperature and after 24 hours at 54° C. and in the freezer.

Dilution Stability

Dilution testing was conducted as per ASTM Standard E-1116-98(2008). The sample was diluted at both 0.125% and 0.25% into 50 ppm, 342 ppm, and 1000 ppm hard water. Both the COC and MSO were diluted at 1 wt. % into hard water. The 25 wt. % and 40 wt. % HSO formulations were evaluated at 0.375 wt. % and 0.50 wt. % dilution. The 1 wt. % quick break oil adjuvant was evaluated at 2.5 wt. %. Photos were taken at 15 minutes, 30 minutes 1 hour, 2 hours, 4 hours, and 24 hours.

Surface Tension

A Kruss Digital Tensiometer K10T was used for surface tension measurements. The method included adjusting bath temperature to 25° C. and waiting until equilibrium. The measurements were conducted using a Wilhelmy plate. The EST measurement unit was filled to ⅔ with clean HLPC water—baseline (around 72.8 mN/m). The adjustment meter was zeroed and set to run. The vessel was moved up, and data collected at equilibrium.

Contact Angle

Contact angle was measured by using a Ramé-Hart goniometer. A drop of the sample was placed on a Parafilm substrate, the light intensity and position of the goniometer was adjusted, and the tangent line at each end of the half circle was measured. The procedure was repeated five times for reproducible measurements.

Physical Properties Examples

A comparison formulation comprising NP9 was prepared for evaluation with the adjuvant formulation of the present invention.

TABLE 1

NP9 comprising formulation (COMP1) comparative example

| Component | Amount (wt. %) |
|---|---|
| NP9 | 50 |
| Oleic Acid | 30 |
| Water | 10 |
| Propylene Glycol | 5 |
| Isobutanol | 5 |

The contact angles were determined and are shown for the comparative formulation and for the formulation of the present invention in Table 2.

TABLE 2

Contact angle results

| | Average Values for Contact Angle (°) | | | | |
|---|---|---|---|---|---|
| Formulation | 0.50% dilution | 0.20% dilution | 0.10% dilution | 0.05% dilution | 0.01% dilution |
| COMP1 | 41.95 | 46.45 | 45.9 | 42.45 | 45 |
| A1 | 31.01 | 31.4 | 33.6 | 34.65 | 36.85 |

The formulation of the present invention resulted in a lower contact angle than the comparative formulation COMM. When comparing performance for different dilution concentrations, the highest concentration (0.5%) provided a lower contact angle although the range of values recorded for concentrations between 0.05% and 0.2% varied by less than 5°.

The surface tension results were determined and are shown for the comparative formulation and for the formulation of the present invention in Table 3.

TABLE 3

Surface tension results

| | Average Values for Surface Tension (mN/n) | | | | |
|---|---|---|---|---|---|
| Formulation | 0.50% dilution | 0.20% dilution | 0.10% dilution | 0.05% dilution | 0.01% dilution |
| COMP1 | 31.6 | 31.6 | 31.9 | 31.9 | 31.7 |
| A1 | 27.95 | 28.1 | 28.65 | 28.2 | 28.6 |

The results shown in Table 3 show the average surface tension measurements for the comparative formulation COMP1 and the formulation of the present invention. A1 provided lower surface tension than the comparative COMP1.

The viscosity results were determined and are shown for the comparative formulation and for the formulation of the present invention in Table 4.

TABLE 4

Viscosity dependence on temperature

| | Viscosity (mPa · s) at shear rate of 100 s$^{-1}$ | |
|---|---|---|
| Temp. (° C.) | A1 | COMP1 |
| 5 | 131.63 | 644.6 |
| 10 | 99.17 | 443.4 |
| 25 | 47.47 | 167.0 |
| 40 | 26.13 | 75.6 |

The formulation of the present invention demonstrated substantially lower viscosity at all tested temperatures than the comparative example.

The formulation of the present invention, and for the comparative formulation, were assessed for solubility and stability. The results for the formulation of the present invention were good and did not exhibit separation under any of the storage conditions. Samples of the formulation of the present invention stored in the freezer solidified, but returned to being homogeneous liquids after a few hours at room temperature.

Unformulated A1 diluted in three different water hardnesses at 0.125% and 0.25% did not form a distinct layer, and instead formed a gradient of turbidity along the Nessler tube after 24 hours. No oil separation was observed.

The agrochemical formulations of the present invention show lower contact angle providing better waxy substrate wetting and greater spreading coefficient. Additionally, the formulations show lower surface tension confirms improved performance compared to traditional non-ionic adjuvant wetting agents.

The solubility of the first and co-adjuvants in a selection of oils and across a range of temperatures as well as its dilution performance both "as is" and as the primary emulsifier in a series of model oil adjuvant products was good to excellent demonstrating broad versatility in non-ionic surfactant, crop oil concentrates, high surfactant oil concentrates, and methylated seed oil adjuvants. Surprisingly these oil-free compositions also appear capable of enhancing the performance of herbicide combinations normally requiring an oil adjuvant in tank mixtures.

Fungicide Adjuvancy Examples

The effectiveness of the adjuvant combination of the present invention was assessed for fungicides against soybean rust disease. The details of the field treatments are described in the Table 5.

TABLE 5

Viscosity dependence on temperature

| Example | Fungicide | Dose (L/ha - %) | Adjuvant | Dose (L/ha - %) |
|---|---|---|---|---|
| F01 | Control - no fungicide | 0.00 | No adjuvant | 0.00 |
| F10 | PrioriXtra | 0.30 | No adjuvant | 0.00 |
| F20 | PrioriXtra | 0.30 | A1 | 0.50 |
| F21 | PrioriXtra | 0.30 | A1 | 0.25 |
| F22 | PrioriXtra | 0.30 | A1 | 0.12 |
| F23 | PrioriXtra | 0.30 | A1 | 0.06 |

PrioriXtra is a fungicide combination of azoxystrobin and ciproconazol obtainable from Syngenta. 200 litres of treatment were applied per hectare. Three applications were done (DAT1, DAT2, and DAT3), with evaluations done at specified numbers of days after treatment.

The phytotoxycity was evaluated by the percentage of the total leaf area affected by the symptoms. The leaves were graded according to symptoms, with 0 grade for no symptoms, 1 for a leaf area with symptoms between 1 and 20%, 2 for between 21 and 40%, 3 for 41 and 60%, 4 for between 61 and 80%, and the grade 5 for leaf area affected over than 81%. The phytotoxycity was evaluated at 3 and 7 days after treatment (DAT) in the each application.

All treatments were at grade 0, and therefore determined as not phytotoxic.

The soybean rust severity was evaluated according to "Diagrammatic Scale for Assessment of Soybean Rust Severity" of EMBRAPA (Empresa Brasileira de Pesquisa Agropecuária—Brazilian Agricultural Research Company). The efficacy of each treatment was calculated in comparison to the control according to the severity of disease in the control treatment and severity of disease in the treatments in both a bottom and top zone of the plant.

The average measurement results of bottom zone analyses are shown in Table 6. The data were evaluated by Tukey method with trust of 95% and the results shown the Severity (SE) and Formulation Efficacy (FE) performance.

TABLE 6

Average measurements (bottom zone of plant)

| Treatment | 15DAT1 | | 10DAT2 | | 13DAT3 | |
|---|---|---|---|---|---|---|
| | SE | Ef (%) | SE | Ef (%) | SE | Ef (%) |
| F01 | 3.46 | 0 | 33.5 | 0 | 41.5 | 0 |
| F10 | 0.12 | 97 | 8.71 | 74 | 29.1 | 30 |
| F20 | 0.09 | 97 | 5.09 | 85 | 15.35 | 63 |
| F21 | 0.13 | 96 | 11.54 | 66 | 24.8 | 40 |
| F22 | 0.13 | 96 | 6.55 | 80 | 20.53 | 51 |
| F23 | 0.08 | 98 | 5.83 | 83 | 20.33 | 51 |

The stage of the disease 13DAT3 was considered as the best to evaluate the product performance because it is in the high-pressure stage, but not the stage of death of all leaves. The field trials showed that the formulations comprising adjuvants of the present invention (F20-F23) had better performance than the formulations without the adjuvants (F01 and F10).

Herbicide Adjuvancy Examples

The performance of the adjuvant blend of the present invention with herbicides was also assessed. Weed species were selected to assess control using various adjuvant treatments and all materials were applied under controlled conditions.

The formulations used in the tests are shown in Table 7.

TABLE 7

Herbicide formulations

| Label | Actives | Other components |
|---|---|---|
| H01 - 7 | Glyphosate & Clethodim | 1% COC, 0.25% NIS, 0.42% AMS |
| H02 - 37 | Glyphosate & Clethodim | 0.25% A1, 0.42% AMS |
| H03 - 38 | Glyphosate & Clethodim | 0.5% A1, 0.42% AMS |
| H04 - 10 | Glyphosate & Saflufenacil | 0.25% NIS, 1.0% MSO, 0.42% AMS |

TABLE 7-continued

Herbicide formulations

| Label | Actives | Other components |
|---|---|---|
| H05 - 40 | Glyphosate & Saflufenacil | 0.25% A1, 0.42% AMS |
| H06 - 41 | Glyphosate & Saflufenacil | 0.5% A1, 0.42% AMS |

COC is crop oil concentrate, NIS is non-ionic surfactant, AMS is ammonium sulphate, and MSO is methylated seed oil.

Formulations containing glyphosate and clethodim were tested by application on volunteer corn (ZEAMX), broadleaf signalgrass (BRAPP), and morning glory species (IPOSS), and the results are shown in Table 8.

TABLE 8

Glyphosate & Clethodim formulation results

| Formulation | ZEAMX 14 DAT | ZEAMX 28 DAT | BRAPP 14 DAT | BRAPP 28 DAT | IPOSS 14 DAT | IPOSS 28 DAT |
|---|---|---|---|---|---|---|
| H01 | 85 | 83 | 97 | 93 | 43 | 45 |
| H02 | 84 | 86 | 86 | 83 | 27 | 33 |
| H03 | 85 | 84 | 94 | 87 | 40 | 37 |

For treatments containing clethodim and glyphosate, use of rates between 0.25% and 0.50% of an adjuvant blend A1 provide statistically equivalent control of glyphosate tolerant corn, signalgrass, and morningglory when compared to full rates of both COC (1.0%) and NIS (0.25%). This adjuvant treatment permits equal or better weed control at significantly lower adjuvant use rates than the full spectrum of materials used to meet both herbicide label recommendations (0.25-0.50% vs. 1.25%). No mineral oil or methyl fatty acid ester was present in the final spray mixture of the present formulation (H02 and H03).

Inclusion of the adjuvants of the present invention also tended towards effective foam control, and facilitated dispersion of the surfactant blend into agricultural spray mixtures.

It is to be understood that the invention is not to be limited to the details of the above embodiments, which are described by way of example only. Many variations are possible.

The invention claimed is:
1. An agrochemical formulation, comprising:
i) a first adjuvant, where the first adjuvant is a fatty ester of an oligomer of glycerol having from 2 to 3 repeat units represented by formula (I):

$$P \cdot [R^1]_m \qquad (I)$$

wherein:
P is the residue of an oligomer of glycerol having from 2 to 3 repeat units and having m active hydrogen atoms;
m is an integer of 3 to 5;
each $R^1$ is independently hydrogen, $C_8$ to $C_{12}$ alkyl, $C_{16}$ to $C_{20}$ alkenyl or an alkanoyl group represented by —C(O)$R^2$, where at least one $R^1$ is an alkanoyl group represented by —C(O)$R^2$;
wherein the alkanoyl group represented by —C(O)$R^2$ is a residue of a $C_{16}$ to $C_{22}$ fatty acid;
ii) a co-adjuvant, wherein the co-adjuvant is an alkoxylated alcohol represented by the formula (II):

$$R^3-O-(AO)_x-H \qquad (II)$$

wherein
R³ is the residue of a fatty alcohol selected from capric alcohol, lauryl alcohol, myristyl alcohol;
each AO is, independently, an oxyethylene (EO) group or an oxypropylene (PO) group; and
x represents an integer in the range from 4 to 7; and
iii) at least one agrochemical active,
wherein:
the contact angle of the agrochemical formulation is less than 40°;
the surface tension of the agrochemical formulation is less than 32 mN/m; and
the viscosity range of the agrochemical formulation is 30 to 60 mPa·s.

2. The agrochemical formulation of claim 1, wherein the oligomer of glycerol is diglycerol.

3. The agrochemical formulation of claim 1, wherein the oligomer of glycerol comprises a triglycerol.

4. The agrochemical formulation of claim 1, wherein the $C_{16}$ to $C_{20}$ alkenyl group is a hexadecenyl, heptadecenyl, octadecenyl, nonadecenyl or eicosenyl group, or a branched variant thereof.

5. The agrochemical formulation of claim 1, wherein the alkanoyl group represented by —C(O)R² is a residue of a fatty acid selected from palmitic acid, stearic acid, arachidic acid, behenic acid, palmitoleic acid, sapienic acid, oleic acid, elaidic acid, vaccenic acid, linoleic acid, linoelaidic acid, arachidonic acid, eicosapentaenoic acid, erucic acid, or docosahexaenoic acid.

6. The agrochemical formulation of claim 1, wherein the alkanoyl group represented by —C(O)R² is a residue of oleic acid.

7. The agrochemical formulation of claim 1, wherein R³ is the residue of lauryl alcohol.

8. The agrochemical formulation of claim 1, wherein the molecular weight (weight average) of the first adjuvant is in the range from 200 to 2,200.

9. The agrochemical formulation of claim 1, which is in the form of a suspension concentrate (SC), an oil-based suspension concentrate (OD), or a suspoemulsion (SE).

10. The agrochemical formulation of claim 1, wherein the first adjuvant and co-adjuvant are present at a combined concentration of from 0.01 wt. % to 2 wt. %.

11. The agrochemical formulation of claim 1, wherein the combined ratio of first adjuvant and co-adjuvant to active agrochemical in the agrochemical formulation is from about 0.1:1 to about 1:1.

12. The agrochemical formulation of claim 1, wherein the agrochemical active is a pesticide or an antimicrobial.

13. A method of preparing the agrochemical formulation of claim 1 comprising combining i), ii) and iii).

14. A method of treating vegetation to control pests, comprising applying the agrochemical formulation in accordance of claim 1 either to said vegetation or to the immediate environment of said vegetation.

* * * * *